(12) United States Patent
Nosek et al.

(10) Patent No.: US 8,050,997 B1
(45) Date of Patent: Nov. 1, 2011

(54) INSTANT AVAILABILITY OF ELECTRONICALLY TRANSFERRED FUNDS

(75) Inventors: Luke Paul Nosek, Palo Alto, CA (US); Christopher Richman, Palo Alto, CA (US); Roelof Frederik Botha, Los Altos, CA (US); Maria Lee, Fremont, CA (US); Kyle Hansen, San Francisco, CA (US); Todd Pearson, Oakland, CA (US); Denise Aptekar, Menlo Park, CA (US)

(73) Assignee: PayPal Inc., San Jose, CA (US)

( * ) Notice: Subject to any disclaimer, the term of this patent is extended or adjusted under 35 U.S.C. 154(b) by 2079 days.

(21) Appl. No.: 10/228,200

(22) Filed: Aug. 26, 2002
(Under 37 CFR 1.47)

Related U.S. Application Data

(63) Continuation-in-part of application No. 09/938,224, filed on Aug. 23, 2001, now Pat. No. 7,191,151.

(60) Provisional application No. 60/316,638, filed on Aug. 31, 2001.

(51) Int. Cl.
*G06Q 40/00* (2006.01)
(52) U.S. Cl. .......... 705/37; 705/35; 705/36; 705/38
(58) Field of Classification Search .......... 705/34, 705/41, 26, 36–38; 379/112
See application file for complete search history.

(56) References Cited

U.S. PATENT DOCUMENTS

| | | | |
|---|---|---|---|
| 5,778,178 A * | 7/1998 | Arunachalam | 709/203 |
| 5,987,500 A | 11/1999 | Arunachalam | |
| 6,021,397 A * | 2/2000 | Jones et al. | 705/36 R |
| 6,212,556 B1 | 4/2001 | Arunachalam | |
| 6,243,689 B1 | 6/2001 | Norton | |
| 6,295,522 B1 * | 9/2001 | Boesch | 705/41 |
| 7,107,241 B1 * | 9/2006 | Pinto | 705/38 |
| 2001/0042785 A1 * | 11/2001 | Walker et al. | 235/379 |

(Continued)

FOREIGN PATENT DOCUMENTS

EP 0481135 A1 4/1992

(Continued)

OTHER PUBLICATIONS

Banks, Biz Clients Ask Treasury to Kill Check Conversion Plan, Andrew Roth. American Banker. New York, N.Y.: Aug. 23, 2001. vol. 166, Iss. 163; p. 1.*

(Continued)

*Primary Examiner* — Alexander Kalinowski
*Assistant Examiner* — Clement B Graham
(74) *Attorney, Agent, or Firm* — Schwegman, Lundberg & Woessner, P.A.

(57) ABSTRACT

A system and method for making proceeds of an ACH (Automated Clearinghouse) transaction available to a user before the transaction is completed. The system may be part of an on-line system or traditional merchant configured to facilitate payments or fund transfers from users. A user requests the transfer of funds to an entity (e.g., another user, a merchant, the user's account with the system) via an ACH entry. The system calculates a risk associated with the user, while considering various data (e.g., number of previous ACH entries, how many failed, how many succeeded, amount of the transfer). If the risk is low enough, the ACH entry is initiated and the desired funds are released for the transfer even before the ACH entry clears. The ACH entry may be presented as a default choice for funding the transfer.

64 Claims, 4 Drawing Sheets

U.S. PATENT DOCUMENTS

| | | | |
|---|---|---|---|
| 2001/0044764 A1* | 11/2001 | Arnold | 705/35 |
| 2002/0032653 A1* | 3/2002 | Schutzer | 705/40 |
| 2002/0101967 A1* | 8/2002 | Eng et al. | 379/114.01 |
| 2002/0120537 A1* | 8/2002 | Morea et al. | 705/35 |
| 2004/0117302 A1* | 6/2004 | Weichert et al. | 705/40 |

OTHER PUBLICATIONS

U.S. Appl. No. 09/938,224 Notice of Allowance mailed Nov. 15, 2006, 9 pgs.

U.S. Appl. No. 09/938,224 Response filed Jul. 27, 2006 to Non-Final Office Action mailed Jun. 1, 2006, 16 pgs.

U.S. Appl. No. 09/938,224 Non-Final Office Action mailed Jun. 1, 2006, 17 pgs.

"Debit Still Waiting for a Frequent Shopper Boom", *POS News vol. 9, Iss 1*, (Jun. 1992), 4 pgs.

Bendo, Yvonne, "Here's What it Tkes to get the Goods from Rental Outlets", *Toronto Star E.6*, (Apr. 16, 1989), 3 pgs.

Campbell, Don G, "Keeping up with Video Rental Records", *Los Angeles Times*, (May 21, 1987), 3 pgs.

Gilje, Shelby, "Video Values—There's More to Renting a Video than Price", *Seattle Times*, (Jun. 11, 1993), 4 pgs.

O'Sullivan, Orta, "When a Check is not a Check", *USBanker. New York. vol. 109, Iss. 7*, (Jul. 1999), 5 pgs.

\* cited by examiner

US 8,050,997 B1

INSTANT AVAILABILITY OF ELECTRONICALLY TRANSFERRED FUNDS

RELATED APPLICATIONS

This application is a continuation-in-part of U.S. application Ser. No. 09/938,224, filed on Aug. 23, 2001 and issued on Mar. 13, 2007 as U.S. Pat. No. 7,191,151, and claims priority to U.S. Provisional Application Ser. No. 60/316,638, filed on Aug. 31, 2001, all of which are hereby incorporated by reference.

BACKGROUND

This invention relates to the fields of computer systems and data communications. A system and method are provided for facilitating instant availability of funds from an ACH (Automated Clearing House) transaction before the transaction clears. More particularly, a method is provided for determining a risk associated with making the funds instantly available.

Among existing methods of making purchases (e.g., consumer purchases of goods or services) and transferring funds from one person or entity to another, ACH transactions have been used relatively sparingly. One reason for their lack of popularity is their relatively languid pace of settlement or completion. This can be frustrating or unacceptable when a party to the purchase or transfer (e.g., a business) requires rapid receipt of the funds. For example, a merchant is understandably reluctant to deliver goods or services until payment is in hand or assured. ACH transactions are not typically settled, however, until at least one business day after they are initiated, and may be rejected or returned for a relatively lengthy period of time, even after settlement.

Thus, the period of time that elapses between the initiation of an ACH transaction and clear availability of the transaction funds tends to make such transactions unattractive when timely consummation is desired. Credit cards, debit cards, ATM (Automated Teller Machine) cards and other means of obtaining instantly available funds are much more compatible with the need for instant gratification and thus tend to be more popular in typical consumer purchases or fund transfers.

The delay encountered with ACH transactions is inherent in the way they are handled. An ACH transaction, or ACH entry, is initiated by an originator (e.g., a company or organization) on behalf of, and with the authorization of, a receiver (e.g., a customer). Thus, "originator" and "receiver" refer to the entities that initiate and receive an ACH entry, respectively. The ACH entry may be either a credit or a debit to the receiver's account.

An originator submits an ACH entry to an originating depository financial institution (ODFI). The ODFI forwards the ACH entry to an ACH operator (e.g., a Federal Reserve Bank) for settlement. The ACH entry is then sent to the respective receiving depository financial institution (RDFI) where it is posted to the appropriate depositor's (receiver's) account. Although ACH transactions are generally conducted electronically, they are typically batch-processed instead of being handled one at a time.

In an ACH credit entry, an originator initiates a transfer to move funds into a receiver's account. For example, the receiver may be the recipient of ACH credit funds in the form of direct deposit (e.g., his or her salary). In this case, the originator is an employer and the receiver is the employee. Or, a consumer may act as an originator and authorize monthly payments (e.g., for a utility, Internet access, loan payment) to a creditor receiver.

For an ACH debit entry, funds flow in the opposite direction as they do for an ACH credit entry. In particular, funds are collected from a receiver's account and transferred to an originator. Thus, when a consumer preauthorizes a debit, the originator is the company or other entity authorized to collect the debt and the consumer is considered the receiver even though the funds are being taken from his/her account.

During the settlement or clearing process, a depository financial institution or ACH operator may "reject" an ACH entry because it is formatted incorrectly or is otherwise unacceptable. Accepted ACH entries are settled on the assumption that the funds are available and will be transferred as specified. Settlement of an ACH entry generally occurs on the business day following its initiation.

However, even after settlement, an RDFI may "return" an ACH debit entry due to insufficient funds in the receiver's account or for some other reason (e.g., a stop payment request, the account was closed). Also, a receiver may reject an ACH entry (e.g., because the entry was not authorized). Thus, settlement of an ACH debit does not guarantee that the receiver has sufficient funds to cover the entry or that the receiver will not repudiate the transaction. If the originator, or the ODFI processing an ACH entry for the originator, releases the funds of the entry too soon, and the RDFI later "returns" the entry because the receiver has insufficient funds or for some other reason, the originator or ODFI may be at risk of losing those funds. There is thus a risk that a receiver may take advantage of the return process to defraud the originator or ODFI.

If the risk of return or rejection of an ACH entry could be predicted with some accuracy, an originator would be better able to determine whether to offer an ACH transaction as a method of payment or a source of funds. However, determining what factors are or may be significant to determining such risk can be problematic. More particularly, risk factors that are relevant may differ depending upon the circumstances, and can be combined in many ways. Some combinations may be more accurate than others.

Although ACH transactions may be riskier or slower for a merchant than credit cards and instruments such as debit cards and ATM cards, they are generally less expensive than these alternative methods of payment. For each credit card transaction accepted by a merchant, the merchant may have to pay a fixed fee plus a percentage of the value of the transaction. For an ATM card, a merchant may have to pay a fixed fee similar in magnitude to that assessed in a credit card transaction. However, the cost to a merchant of an ACH transaction may be on the order of just a few cents. If ACH transactions could be employed for more consumer transactions, merchants' costs would be decreased, and these savings could be passed on to consumers.

Therefore, what is needed is a method of making the proceeds of an ACH transaction available without the delay that is normally incurred while waiting for the transaction to close. There is also a need for a system and method for determining a level of risk associated with making the proceeds available before the transaction closes.

SUMMARY

In one embodiment of the invention, a system and method are provided for making funds of a receiver (e.g., system user or consumer) available without the delay normally incurred in the processing of an ACH (Automated Clearinghouse) transaction to obtain the funds.

In another embodiment of the invention, a risk associated with a requested ACH entry is calculated to determine whether or not to make the proceeds of the ACH entry immediately available. In this embodiment, a receiver desires to make a purchase or transfer funds, and wishes to obtain all or some of the necessary funds through an ACH debit. The system considers details of the desired ACH entry, the purchase or transfer, and other factors, and then generates a risk score. The system may consider the success, failure and/or other details of past ACH entries and previous purchases or transfers requested by the receiver. The system may also consider whether the receiver's identity or financial account(s) have been verified, a level of trust in the receiver's apparent identity and/or various other factors.

Depending on the risk score, the system may make the proceeds of the ACH entry immediately available to the receiver (i.e., before the entry clears). Or, the risk score may indicate that the ACH entry proceeds should not be made immediately available, in which case the system may postpone availability until the ACH entry settles, or may allow a different type of transaction to obtain the desired funds (e.g., an electronic check, a charge to a credit card or debit card).

In one embodiment of the invention, the system receives a request from a receiver to conduct a transaction involving a first value. The transaction may involve the payment or transfer of funds to another entity (e.g., a merchant, another system user) or the receiver's own account with the system. The system may authorize the first value against a credit source associated with the receiver (e.g., a credit card, a credit line). The system may later place a hold against the credit source for the first value, in order to hold that amount for the system to charge, if necessary. The system then initiates an ACH debit, in the amount of the first value, to retrieve it from an account the receiver has with a financial institution (e.g., bank, credit union, mutual fund, brokerage, savings and loan). If the ACH debit is rejected, returned or repudiated, all or a portion of the first value may be charged against the credit source.

When a receiver requests the execution of a value transfer, payment via ACH may be the default method of paying for the transfer; other options may, however, be selectable (e.g., credit card, debit card, credit line, electronic check). In addition, if the user has verified one or more financial accounts (or other accounts from which ACH funds may be drawn) and/or credit sources, the user may be prompted to select from the accounts and/or credit sources for the transfer.

In another embodiment of the invention, instead of initiating an authorization and/or a hold against a credit source before initiating the ACH debit process, the system may charge the value to the credit source. Then, if the ACH debit settles without incident, the credit source may be credited with the amount received via the debit (e.g., which may be all or just a portion of the amount requested).

DETAILED DESCRIPTION

Figure 1A:
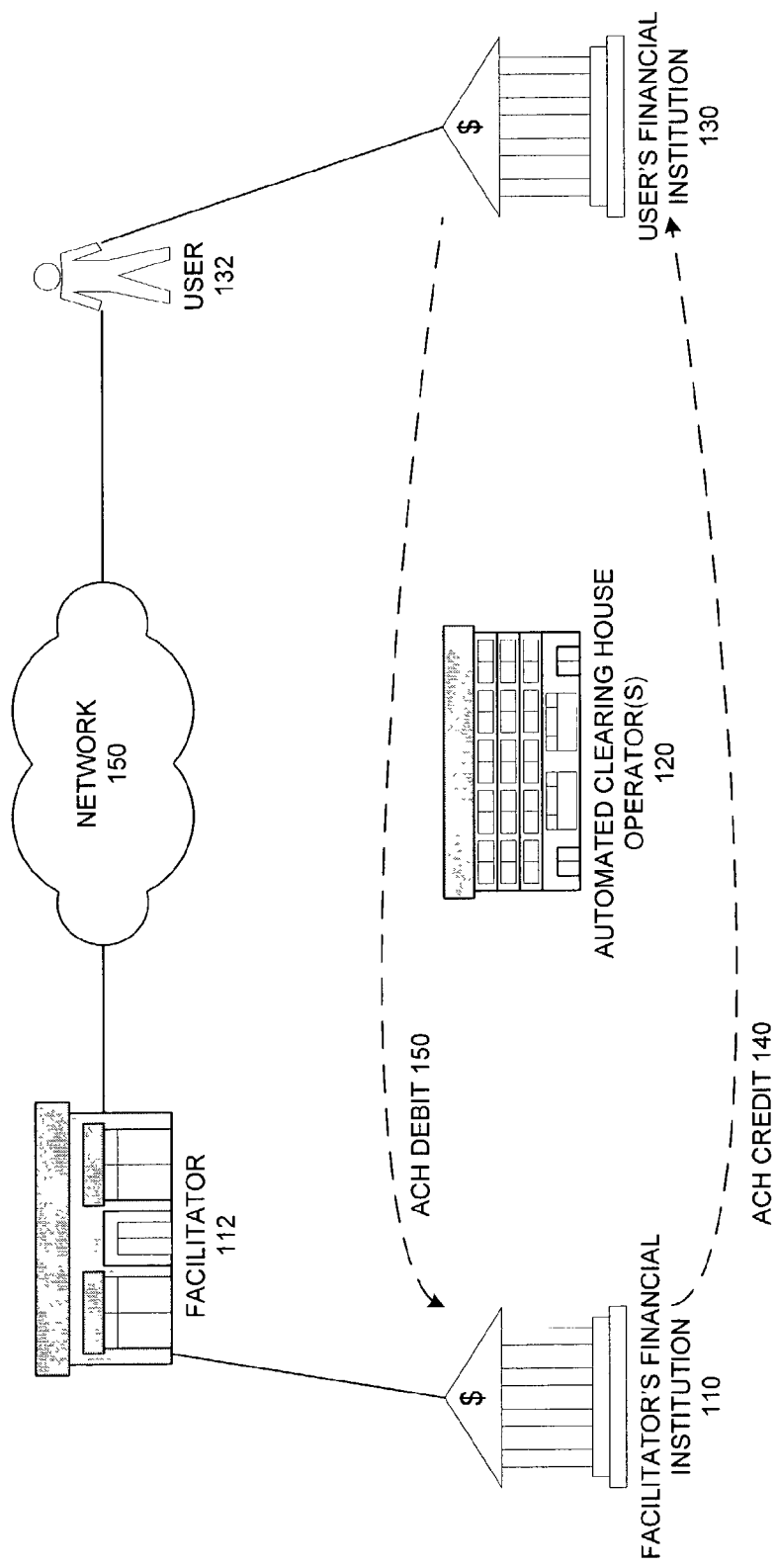
FIG. 1A is a block diagram depicting one environment in which ACH debit funds may be made available before the ACH debit entry is cleared through an Automated Clearing House (ACH) process, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed may incorporate a general-purpose computer or a special purpose device such as a handheld computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

In one embodiment of the invention, a system and methods are provided for making available the proceeds of an ACH (Automated Clearing House) transaction or entry—particularly an ACH debit—without waiting for the entry to pass through the entire ACH clearing or settlement process. Thus, funds from a financial institution account (e.g., bank, credit union, savings and loan, mutual fund, brokerage) may be retrieved through the ACH process and made available for a requester without the normal delay. For example, a user or consumer may choose to pay for a transaction (e.g., a purchase of a good or service, a transfer of funds to another person or entity, a transfer of funds into the user's account) with funds from his or her banking institution.

In the terms of the ACH process, the consumer or user may be considered the receiver, while the system acts as the originator of an ACH entry to send funds to or retrieve funds from a financial account of the receiver. The originator may initiate an ACH entry through an ODFI (Originating Depository Financial Institution), and the institution holding the receiver's funds that are targeted by the ACH entry is considered the RDFI (Receiving Depository Financial Institution).

In a typical ACH debit process, funds requested by an ODFI from an RDFI may be received within a few business days after the debit is initiated. Or, the ODFI may be notified that the debit failed or was rejected (e.g., because insufficient funds are available to complete the transaction). Even if the funds are received within a few days, however, they may be retracted by the RDFI if it determines that the receiver's account has insufficient funds. Thus, until a sufficient period of time passes for the RDFI to check for available funds (e.g., several business days), the ODFI risks making the funds available to or for the originator and not recouping them from the RDFI.

In an embodiment of the invention, the receiver indicates a desire to perform a value transfer. The value transfer may involve a transfer of funds to a merchant, the user's own account with the system, another user of the system or some other entity (e.g., for a good or service). Based on various factors, the system then calculates an ACH risk score indicating a perceived risk involved with releasing the funds before they are retrieved from a financial account of the user via an ACH entry. The various factors may include details of the ACH entry or value transfer, the receiver's past history of value transfers, ACH entries and/or other transactions, a level of confidence in the receiver (e.g., regarding his/her financial data, identity, trustworthiness, honesty or other trait), and so on.

Based on the calculated ACH risk score, the system may or may not allow the receiver to obtain funds for the value transfer via an ACH entry and may or may not make the funds instantly available (e.g., before the ACH entry clears or settles).

In another embodiment of the invention, the funds of an ACH entry are authorized, held or allocated against an available credit source of a receiver (e.g., credit card, credit line, debit card) and may be released or made available immediately thereafter as long as the authorization operation is successful. If the ACH entry is rejected or returned, then the funds may be charged to the credit source. If the ACH entry is successful, the authorization or hold may be removed.

In one alternative method of the invention, funds may be charged against a receiver's credit source at the time an ACH entry is initiated and, if the ACH transaction is successful, the funds may then be credited back to the credit source.

Thus, in embodiments of the invention described herein, funds from a user or consumer's bank account may be available to the user or other entity without the normal delay inherent in an ACH entry. ACH transactions can therefore be made as convenient to the user as a credit card or other instrument. In addition, a merchant or other institution accepting the user's payment or value transfer via ACH transaction may benefit from the lower costs normally assessed such transactions.

FIG. 1A depicts an environment in which a receiver (e.g., a system user) may immediately receive the use of funds requested via an ACH debit when the ACH entry is initiated, but before it is completed, according to one embodiment of the invention. The funds may be desired for various types of transactions, such as making a purchase, transferring funds from one user account to another account, to another entity, etc.

Illustratively, the user may choose to use, or accept a default selection to use, funds from his or her bank account or other account that allows funds to be transferred or withdrawn via an ACH entry. In addition, if the user has verified multiple bank accounts (or other accounts from which ACH funds may be drawn) and/or multiple credit sources, the user may be prompted to select from the multiple accounts and/or credit sources.

In FIG. 1A, financial institutions 110, 130 are banks, savings and loans, credit unions, mutual funds, investment companies or other entities capable of conducting ACH transactions. Thus, institution 110 is configured as an ODFI to initiate ACH entries (e.g., on behalf of facilitator/originator 112), while institution 130 is configured as an RDFI to receive ACH entries (e.g., on behalf of user/receiver 132). ACH entries are processed and settled through ACH operator 120, which may comprise any number of operators—such as separate originating and receiving operators. Thus, ODFI 110 may initiate ACH credit 140 to send funds (e.g., from an originator account at institution 110) to RDFI 130 and/or initiate ACH debit 150 to receive funds from a receiver account at institution 130.

In this embodiment of the system, facilitator 112 uses the services of institution 110 to perform ACH transactions and/or other transactions (e.g., credit card, debit card, ATM card). Facilitator 112 may be a retail or wholesale merchant or other business, may operate on-line via public network 150 (e.g., the Internet), via telephone, in a traditional "brick and mortar" venue, etc.

In one particular embodiment of the invention, facilitator 112 is an on-line company, organization or other entity that enables users to transfer value (e.g., money) to and/or from another entity (e.g., a business, a financial instrument, another user). The value may be employed by user 132 to purchase a good or service, make an investment, pay a debt, play a game, make a gift, or for virtually any other purpose.

U.S. patent application Ser. No. 09/560,215, entitled "System and Method for Electronically Exchanging Value Among Distributed Users" and filed Apr. 28, 2000, which issued Aug. 8, 2006 as U.S. Pat. No. 7,089,208, describes a system and method for facilitating the electronic exchange of value between users and is hereby incorporated in its entirety.

In the embodiment of the invention depicted in FIG. 1A, user 132 has an account with financial institution 130 (e.g., a checking or other account compatible with ACH transactions). User 132 may interact with facilitator 112 directly or through network 150 with a desktop, notebook, handheld or other type of computing or communication device, via wired or wireless technology.

Before initiating an ACH transaction on behalf of user 132, facilitator 112 may require verification of the user's account with financial institution 130 and/or the availability of some form of credit. The credit source may be a credit card or a credit line granted by facilitator 112, institution 130 or some other entity, or may be a debit card, ATM card or some other type of credit now known or hereafter developed.

In one method of the invention, facilitator 112 receives a request from user 132 to pay some amount of value to a specified entity (e.g., a merchant, another user). Facilitator 112 may require the user to register before allowing such action, and may verify that the user has an account with institution 130 and a valid source of credit, that the user can be reached at a particular electronic mail address, physical address, telephone number, etc. Facilitator 112 may grant a user an internal line of credit based on a credit check, verification of the user's personal data, etc.

To permit or enable a particular transaction or transaction detail (e.g., a desired source of funding, instant availability of the proceeds of an ACH debit), facilitator 112 may calculate a risk score pertaining to the requesting user and/or a requested ACH transaction. In calculating the risk score, the facilitator may consider the user's transaction and ACH history (e.g., details of the transactions and ACH entries, whether they were successful or unsuccessful), whether the user's financial data (e.g., bank account(s), credit card(s), mailing address) have been verified, the amount and/or purpose of the current transaction, the identity of another party to the transaction, etc.

After the user's account with institution 130 and credit source are verified, facilitator 112 may attempt to authorize or hold the requested amount of value against the user's credit source. This may be done through financial institution 110 or some other party. If this action fails, the user's requested transaction may be rejected. If this action succeeds, however, the funds may be released as requested and the ACH process may be initiated to retrieve the funds from the user's account at institution 130. If the ACH process succeeds, then the authorization or hold placed on the user's credit source may be removed or allowed to expire. If the ACH process fails, then the funds may be charged against the user's credit source.

In one embodiment of the invention, the risk score calculated by the system may determine whether an authorize or hold is placed on the user's credit source and/or whether the proceeds of the ACH entry are immediately provided to the user.

Figure 1B:
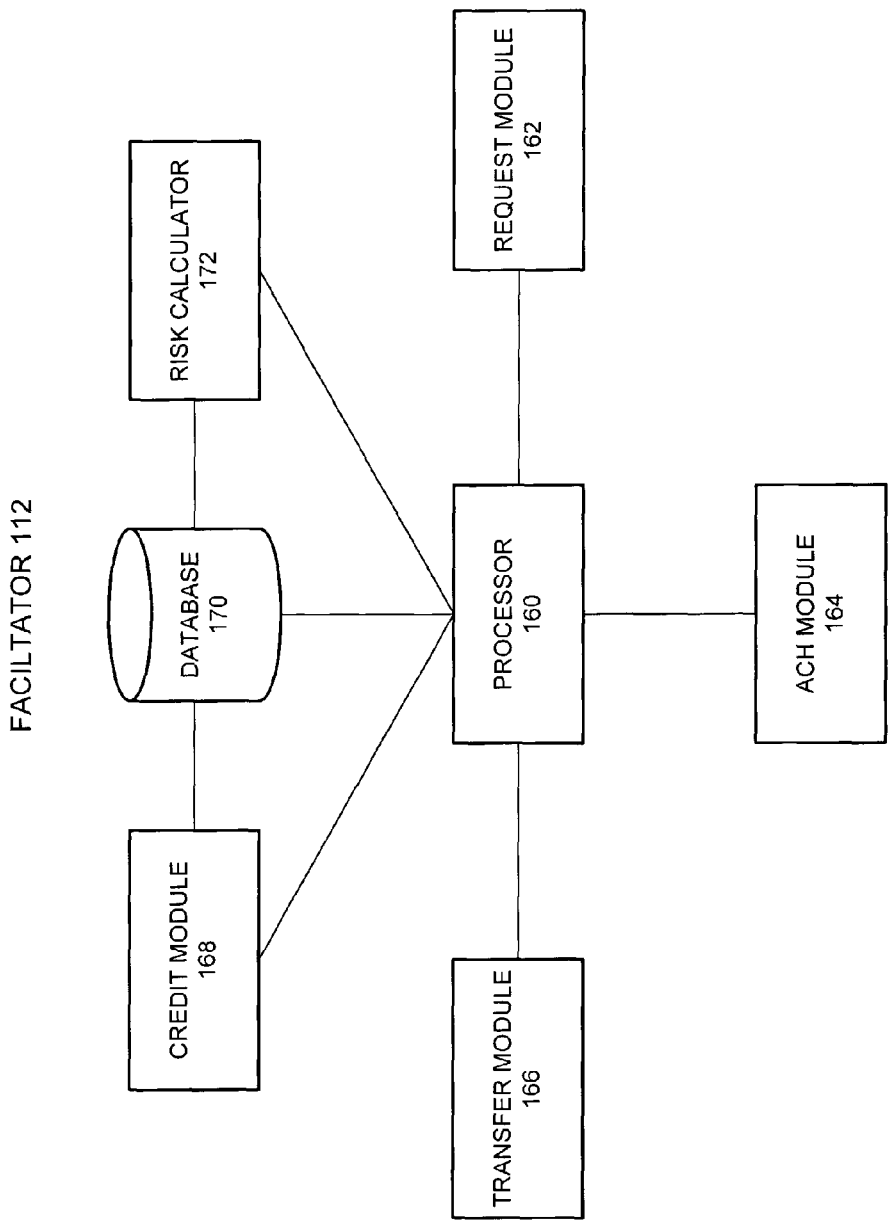
FIG. 1B is a block diagram of the facilitator of FIG. 1A, according to one embodiment of the invention.

FIG. 1B is a block diagram depicting one embodiment of facilitator 112 (of FIG. 1A) for accepting an ACH debit as a source for a payment or transfer of funds before debit is cleared through the ACH process.

In the embodiment of FIG. 1B, facilitator 112 includes processor 160, which is configured to coordinate various tasks involved in receiving a value transfer request, determining a risk score, initiating an ACH debit (or credit) entry, ensuring credit availability, performing the transfer, etc. Processor 160 may include, execute or operate any of the various modules depicted in FIG. 1B. Additionally, facilitator 112 may include multiple processors and each processor may control any of the modules. Yet further, the modules may be distributed across one or more computer systems that cooperate to function as facilitator 112.

Illustratively, request module 162 receives a value transfer request from a user and may elicit any information that is needed or not already possessed by the facilitator (e.g., ABA (American Bankers Association) number, routing number, credit source). ACH module 164 is configured to initiate an ACH process (e.g., debit or credit) under the direction of processor 160 (e.g., after a user's credit availability has been verified). ACH module 164 may thus interact with institution 110 (of FIG. 1A) or another entity involved in the ACH process. Transfer module 166 is configured to perform the requested value transfer after credit availability has been verified and may also interact with institution 110.

In the embodiment of the invention illustrated in FIG. 1B, credit module 168 is configured to identify or verify a user's credit source or a detail of the credit source, and/or perform any or all of the necessary actions to ensure that funds transferred at the request of the user are available, held and/or charged to the credit source if needed. Thus, the credit module may perform an authorization, a hold and/or a charge action against the credit source.

Risk calculator 172 is configured to determine a risk score associated with a user regarding the value transfer and/or the user's desired method of funding the transfer (e.g., ACH, credit card). Illustrative methods of determining a risk score and factors that may be considered during the calculation are described in a following section.

Credit module 168 and/or risk calculator 172 may interact with an internal or external entity configured to provide a measure of the credit-worthiness, trustworthiness of the user. The measure may reflect whether a user's credit card has been reported lost or stolen, whether a credit card number is valid, whether a user's specified address matches an address of a credit card, and so on. In one embodiment of the invention, the third party performs analytical modeling regarding the user or user data, and provides a standard or proprietary rating.

Credit module 168, risk calculator 172 and/or processor 160 may access database 170 to retrieve and/or store various information concerning a user (e.g., bank account number, credit card number, electronic mail address, past transaction history) or another party to the user's desired value transfer.

Instant Availability of ACH Funds

Figure 2:
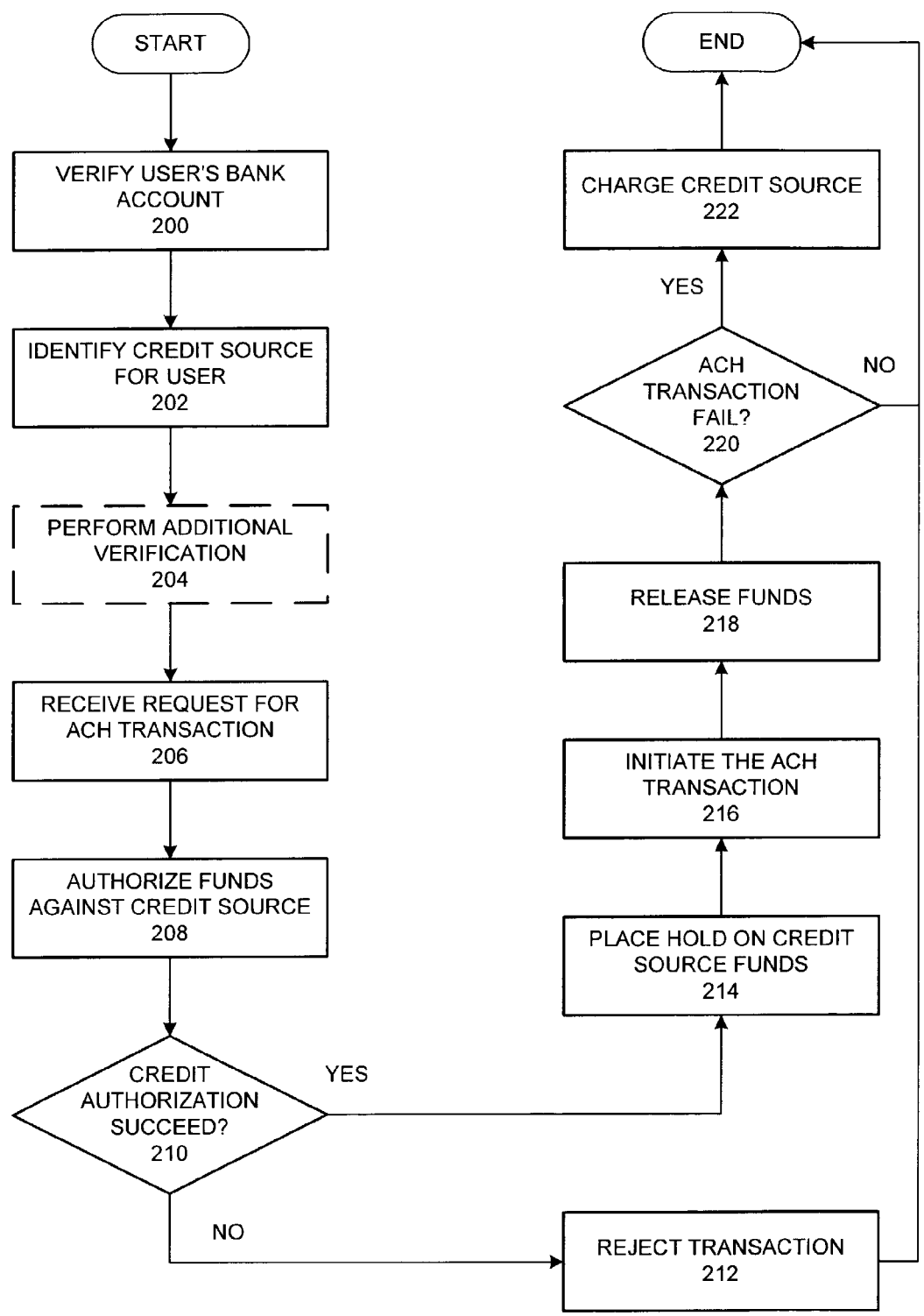
FIG. 2 is a flowchart illustrating one method of making funds from an ACH debit available before the debit entry clears, in accordance with an embodiment of the invention.

FIG. 2 is a flowchart demonstrating, in further detail, one method of employing a system such as that of FIG. 1A to make funds from a user's bank account (or similar source) available before an ACH debit to that account clears, according to one embodiment of the invention.

In this embodiment, one entity (e.g., user, consumer) wishes to transfer or pay some amount of value, from his or her account with a bank or other institution, to another entity, using a payment/transfer system such as facilitator 112 of FIG. 1A. The user may already be known to and have an account with the system, or may register and initiate the following procedure at the time the payment or transfer is desired. Similarly, the entity to receive the value may already have an account with, or otherwise be known to, the system, or may be registered in conjunction with the transfer of the value.

In the illustrated embodiment of the invention, the user initiating the transfer of value may be considered the receiver of an ACH entry, while the payment/transfer system is the originator.

In state 200, the payment/transfer system verifies the user's bank account that an ACH transaction will target. The system may, for example, elicit the necessary ABA (American Bankers Association) routing number and account number from the user (which the user may retrieve from a paper check associated with the bank account). Existence of the account may then be verified by any practical means (e.g., electronic query, telephone call to the bank, reference to a third party verification service). If the user's bank account cannot be verified, or does not appear to be associated with this user, the system will not attempt to draw upon it and a different bank account may be identified and verified in order for the user to use the system.

In state 202, the system identifies and/or verifies a credit source available to the user, or may establish one for the user. Thus, the credit source may be internal to the system (e.g., the system may offer lines of credit to some or all users) or external (e.g., a credit card, charge card, other line of credit). Illustratively, the user may provide the details of a credit card (e.g., name, number, expiration date) and the system may query an electronic service (e.g., offered by the credit source or a third party) to ensure that the card has not been reported as lost or stolen or otherwise invalidated. Further, for an external credit source, the system may verify that the source has available credit by performing an authorization for a small amount (e.g., one dollar). If the authorization fails, then the user may not be allowed to make a payment or transfer with this credit source.

If the system is configured to grant an internal line of credit to a user, the system may perform additional verifications of the user's personal data (e.g., physical address, employer, telephone number), may perform a credit check, may determine if the user has had any previous transfers/payments through the system rejected, etc.

In state 204, which is optional, additional verification of the user's bank account and/or credit source may be performed, depending on what was done in states 200-202. For example, to verify the user's control of the bank account, the system may make a deposit to the account and require the user to identify the amount and/or date of the deposit. Presumably, the user must have access to the account to obtain this information. And, if not already done, the system may perform an authorization against the credit source to test it.

In state 206 the system receives a request from the user to make a payment or transfer to another entity (e.g., a merchant, a service provider, another user, a government agency). The request may be received directly from the user (e.g., the user may submit the request through a web site associated with the system), from a merchant that is being visited by the user and which has a suitable agreement with the system, etc. Thus, the request may be received on-line, or may be received in person, telephonically, via electronic or regular mail, or in some other way.

Various pieces of information may be included in the request or may be elicited by the system. Such information may include an identity of the recipient and an amount to be transferred, and will indicate that the user wishes to make the payment/transfer using a (verified) bank account (e.g., through an ACH entry).

Illustratively, the recipient may be another user of the system, or otherwise known to the system, in which case the recipient may be identified with a name, user name, account name or number, electronic mail address, telephone number, social security number or other unique form of identification.

In one embodiment of the invention, the originating user may employ this process to transfer funds from the bank account into his or her account with the system. The user may select a "pay by bank account," "electronic debit," or similarly worded option from a list identifying acceptable methods of payment, or the system may mark this option as a default, in which case the user may accept it or choose another option. Illustratively, other options for funding a payment or transfer of value may include credit card, regular ACH (e.g., without immediate release of the funds), debit card, ATM card, electronic check, etc.

In state 208 the specified funds are authorized against a (verified) credit source of the user. Illustratively, if the credit source is a credit card, this involves an established procedure in which the system verifies with the credit card issuer or institution that the user's account has sufficient available or unused credit to cover the amount of the payment/transfer. In this embodiment of the invention, the authorization provides a reliable source of funds for the user's value transfer, in the event the ACH entry is rejected, returned or repudiated.

In state 210 the system determines whether the authorization was successful. If so, the illustrated procedure continues at state 214. Otherwise, in state 212 the user's transaction is rejected and the process ends. The user may, however, retry the transfer using different details (e.g., a different bank account or credit source, a different amount).

In state 214, the system places a hold on the user's credit source, in the amount of the payment/transfer. Illustratively, for a credit card this action involves an established procedure in which the credit card institution is directed or requested to reserve the specified amount of credit from being used or charged by other entities. Thus, by holding the funds with the credit source, the system can ensure that the funds will be available if the ACH transaction fails. Depending on how long a hold normally lasts (e.g., which may be determined by the credit issuer), a hold and/or an authorize may be renewed or repeated if the hold or authorize expires before the ACH process is completed.

In state 216 the system initiates the ACH transaction. Illustratively, the system may be allied with a bank or other financial institution (e.g., an ODFI) that has access to an ACH system, in which case the bank is directed to initiate an ACH entry and is provided necessary information (e.g., the user's ABA and routing numbers, amount). Alternatively, the system itself may have direct access to the ACH process.

In state 218 the system releases or pays the desired funds as requested (e.g., to the user's account, a merchant, another user). Illustratively, the system may limit the amount of money or other value that a user may pay/transfer in one ACH transaction or from one account. Such a limit may be applicable to new users and may be raised as the user exhibits a trustworthy pattern of system usage.

In state 220, the system determines whether the ACH entry is rejected or returned. Return of an ACH debit (e.g., because of insufficient funds in the receiver's account) may take a variable amount of time, but if not received within a threshold period (e.g., several days), the system may assume that the transaction succeeded. If the transaction is a success, the system may use the received funds to replace those released to/for the user. Further, the system may cancel the hold that was placed on the user's credit source or, alternatively, may just allow it to expire. If the ACH entry has not failed (e.g., been returned or rejected), then after the funds are received and applied, the illustrated procedure ends. Otherwise, if the ACH entry failed, the procedure continues at state 222.

In state 222, the user's credit source is charged the amount that failed to clear through the ACH process. Thus, if the entire transaction failed, the full amount of the payment/transfer may be charged. Otherwise, if a portion of the funds is received, the remaining funds may be charged. The procedure then ends.

In one embodiment of the invention, the user may be given a bonus or rebate. For example, because of the reduced costs that may be incurred by the system for funding a value transfer via an ACH entry, as compared to the costs incurred for a regular credit card transaction, some of the savings may be returned to the user.

One alternative embodiment of the invention may be implemented for other types of electronic fund transfers or transactions (besides ACH debits or credits), such as point-of-sale transfers, automated teller machine transfers, direct deposits or withdrawals of funds, transfers initiated by telephone, wire transfers, transfers resulting from debit card transactions, etc.

Calculating a Risk Score

In one embodiment of the invention, a method of calculating a risk associated with a user's desired value transfer, or method of funding a transfer, is provided. Illustratively, the risk may be used to determine whether funds for the transfer may be made available to the user before they are irreversibly received from a source (e.g., an account at an external bank or other financial institution). This embodiment may be implemented by a payment/transfer system, as described in a previous section (e.g., facilitator 112 of FIG. 1A).

In one implementation of this embodiment, an ACH risk score is calculated to reflect a level of risk involved in making proceeds of an ACH entry immediately available to a user, before the entry clears or the ACH entry becomes irreversible. This type of ACH entry may be considered an "instant ACH" entry. In other implementations, a risk score may be calculated specifically for electronic checks and/or "normal" ACH entries (i.e., non-instant ACH entries).

In this embodiment of the invention, a risk score may indicate whether a user's value transfer should be allowed or denied, or whether the system should approve or reject a desired source of funds for a value transfer, a user's continued use of the system, instant availability of the funds, etc. For example, if considered too risky, a user may be required to fund a value transfer from a verified credit source rather than through an ACH entry.

Or, a risk score may cause the system to allow or require a user to alter one or more details of a value transfer (e.g., amount, source of funds for the transfer, require a "normal" ACH entry rather than an "instant" ACH entry). Also, depending on a user's risk score and/or other factors (e.g., amount of a transfer), a hold or authorization against a credit source user may or may not be performed when an instant ACH entry is initiated.

In an embodiment of the invention, a risk score is calculated based on a user's history of ACH entries, details of a requested value transfer (e.g., amount, recipient, purpose), and/or other factors. The considered factors are predictive, or may be predictive, of the success of an ACH entry initiated to retrieve funds from the user's targeted bank account.

Some of the factors that may be considered include the number of outstanding (e.g., not completed) value transfers or ACH entries a user has and the total amount involved in the outstanding transfers, which may be tracked on a per-source (e.g., bank account, credit source) basis. An "outstanding" ACH entry may be an entry that has not yet been submitted to the ACH system (e.g., to an ODFI) or that is in process within the ACH system.

The factors may also include the number or ratio of ACH entries and/or electronic checks for the user that have been rejected, returned or that successfully completed, the total amount of funds involved in the outstanding ACH entries, the length of time that the user has been affiliated with the system, and so on.

Some factors may lead the system to deny an instant ACH entry without even calculating or considering a risk score. For example, a user may be limited to a maximum number of outstanding ACH entries, or a maximum amount of value among all outstanding ACH entries. Also, an instant ACH entry may only be offered or allowed for users having positive (or non-negative) balances in their system accounts.

In one embodiment of the invention, factors considered when calculating an ACH risk score include one or more of the variables listed in TABLE 1. In this embodiment, the risk of providing immediate availability of funds requested via an ACH entry is inversely proportional to the ACH risk score. Thus, the higher the risk score, the lower the perceived risk associated with granting a user's instant ACH request. TABLE 1 identifies several variables, describes them and indicates their impact on an ACH risk score.

TABLE 1

| Variable | Description | Impact on Risk Score |
|---|---|---|
| Amount_Ratio | Ratio of the amount of the requested ACH entry to the average amount of previously requested ACH entries | As Amount_Ratio ↑, risk score ↓ |
| ACH_Attempts | Number of ACH entries previously attempted | As ACH_Attempts ↑, risk score ↑ |
| ACH_Completed | Number previous ACH entries completed for the user (e.g., cleared and failed) | As ACH_Completed ↑, risk score ↑ |
| ACH_Outstanding | Number of ACH entries outstanding for the user | As ACH_Outstanding ↑, risk score ↓ |
| Credit_History | Indication of whether the user has ever completed a credit card transaction | If none, risk score ↓ |
| Payments_Received | Number of payment transfers received through the system | As Payments_Received ↑, risk score ↓ |
| Payments_Sent | Number of payment transfers sent through the system | As Payments_Sent ↑, risk score ↑ |

TABLE 1-continued

| Variable | Description | Impact on Risk Score |
|---|---|---|
| Reject_Ratio | Ratio of the user's failed ACH entries to all ACH entries | As Reject_Ratio ↑, risk score ↓ |
| Trust_Level | A measure of trust in the user's indicated identity | As Trust_Level ↑, risk score ↑ |
| User_Life | Duration of the user's relationship with the system | As User_Life ↑, risk score ↑ |

Other variables, beyond those listed in TABLE 1, may also be considered in other embodiments of the invention. For example, the type of ACH transaction (e.g., instant, normal, electronic check) may be considered. Another detail that may be considered when calculating an ACH risk score is the requesting user's primary credit source (e.g., debit card, credit card, credit line offered by the system). For example, a debit card may be considered more risky than other sources (and therefore lower an ACH risk score). Illustratively, a debit card may be associated with the same bank account or financial account on which a user requests an ACH entry. By the time the ACH entry is processed, the user may have used the debit card to remove funds from the bank account. In addition, if an ACH entry fails, it is likely that a charge against a debit card tied to the same account will also fail.

Other factors that may be considered include whether and how often an authorization or hold against a user's credit source has failed, the reasons why credit card or ACH transactions for the user have failed or been rejected, etc.

In one embodiment of the invention, a user may request a series of automatic ACH entries on a periodic or regular basis (e.g., monthly, weekly). Details of the entries (e.g., recipient, amount, external account to be used) may be the same each time, or may differ. Illustratively, a risk score may be calculated before each ACH entry or one score may be used to enable or authorize multiple entries.

An equation for calculating a risk score may include any number of terms. The terms may be modified by different coefficients or variables, or a different equation may be used, depending on the circumstances under which the risk score is being calculated or the reason for calculating the risk score (e.g., instant ACH entry vs. normal ACH entry, type of entity receiving the value transfer).

In one embodiment of the invention, any or all of the conditions or values listed in TABLE 2 and/or variables listed in TABLE 1 may be used to generate or calculate an ACH risk score equation. In this embodiment, monetary amounts may be expressed in cents (or comparable units for non-U.S. currency).

TABLE 2

| Condition | Definition |
|---|---|
| cleared_count | Number of ACH entries initiated by the user that have successfully cleared. |
| cleared_sum | Sum of user's successful cleared ACH entries. |
| distinct_receipts | Number of different users from whom the user has received value transfers |
| distinct_payments | Number of different users to whom the user has made value transfers |
| failed_count | Number of ACH entries initiated by the user that have failed. |
| failed_sum | The total sum of the user's failed ACH entries. |
| first_charged | Indicates how long ago the user first charged something to a primary credit card. If 0, user has never made a charge to the credit card. |

TABLE 2-continued

| Condition | Definition |
|---|---|
| funding_amount | Monetary amount of the requested ACH entry. |
| max_cleared | The amount of the largest ACH entry successfully initiated by the user. |
| out_amount | The total amount of the user's outstanding ACH entries. |
| out_count | The total number of outstanding ACH entries for the user. |
| recipient_type | The type or category of the recipient of the value transfer (e.g., type of merchant, type of business). The assigned type may indicate the recipient's type of business, a level of risk associated with the recipient or recipient's business, etc. |
| recipient_life | Indicates how long ago the recipient's account with the system was created. |
| user_type | The category or type of the user (e.g., personal, business). |

In different risk score equations, a value of a condition in TABLE 2 or a variable of TABLE 1 (or some other condition or variable) may be used by itself as a term, may be used to derive a term, or may be used to derive a variable or coefficient within a term. A risk score equation may have any number of terms, and may be tuned over time to suit the type of transaction for which an ACH entry is requested (e.g., value transfers with particular types of merchants, value transfers by particular types of users).

In an embodiment of the invention, one of the following equations may be used to calculate an ACH risk score. These equations may be modified to include additional or fewer terms without exceeding the scope of the invention. Some terms may be taken directly from the conditions of TABLE 2; derivation of other terms is described below.

$$\text{SCORE} = \ln\_funding + first\_charged1 + user\_type1 + out\_amount1 + out\_count1 + out\_count2 + out\_count3 \quad (1)$$

$$\text{SCORE} = \ln\_funding + out\_count1 + first\_charged1 + first\_charged2 + user\_type1 + recipient\_life1 + recipient\_type1 + distinct\_rcv1 + distinct\_rcv2 + out\_amount1 \quad (2)$$

$$\text{SCORE} = \ln\_funding + funding\_ratio1 + first\_charged1 + first\_charged2 + first\_charged3 + out\_amount1 + failed\_cnt\_ratio + out\_count1 + out\_count2 + cleared\_sum1 + cleared\_sum2 + failed\_sum1 + failed\_sum2 \quad (3)$$

$$\text{SCORE} = \ln\_funding + funding\_ratio1 + funding\_ratio2 + first\_charged1 + first\_charged2 + first\_charged3 + user\_type1 + recipient\_life1 + distinct\_pay1 + distinct\_pay2 + failed\_count + failed\_sum1 + failed\_sum2 \quad (4)$$

As described previously, equations (1)-(4) may be used in different circumstances. For example, equations (1) and (2) may be used when calculating an ACH risk score for a user's first transaction with the system, while equations (3) and (4) may be used for subsequent transactions. In particular, a user has no transaction history to rely upon during his or her first transaction, and so the ACH risk score equation may depend upon fewer factors. In contrast, equations (3) and (4) can consider the number, magnitude and success or failure of the user's previous transactions.

Similarly, equations (1) and (3) may be suitable for use with one particular type of value transfer (e.g., transfers to a merchant in one type of business), while equations (2) and (4) may be appropriate for a different type of value transfer (e.g., transfers to merchants engaged in a different type of business).

Derivation of the terms of the illustrated equations is now described, staring with calculations of some intermediate and common values for use in one or more equations. The value $Y_i$ indicates a threshold value for calculating or determining a term's value (various conditions from TABLE 2 are used in the derivations). Different thresholds may be used for the same term in different equations or for application of the same equation under different circumstances (e.g., different user requesting the transfer, different recipient or type of recipient).

Common Terms and Intermediate Values:

$\ln\_funding = \ln(funding\_amount)$; {ln=natural log}

$failed\_sum\_ratio = failed\_sum/(cleared\_sum + failed\_sum)$;

If $max\_cleared = 0$ then $funding\_ratio = 0$, else $funding\_ratio = (funding\_amount/max\_cleared)$;

If user_type is "personal" then $user\_type1 = 1$, else $user\_type1 = 0$;

Equation (1) Terms:

If $first\_charged > Y_1$ then $first\_charged1 = 1$, else $first\_charged1 = 0$;

If $out\_amount \leq 0$ then $out\_amount1 = 0$, else $out\_amount1 = \ln(out\_amount)$;

If $Y_2 \leq out\_count \leq Y_3$ then $out\_count1 = 1$, else $out\_count1 = 0$;

If $Y_4 \leq out\_count \leq Y_5$ then $out\_count2 = 1$, else $out\_count2 = 0$;

If $out\_count \geq Y_6$ then $out\_count3 = 1$, else $out\_count3 = 0$;

Equation (2) Terms:

If $first\_charged \leq 0$ then $first\_charged1 = 1$, else $first\_charged1 = 0$;

If $0 < first\_charged \leq Y_7$ then $first\_charged2 = 1$, else $first\_charged2 = 0$;

If recipient_type is "low risk" then $recipient\_type1 = 1$, else $recipient\_type1 = 0$;

If $out\_amount > Y_8$ then $out\_amount1 = 1$, else $out\_amount1 = 0$;

If $out\_count > Y_9$ then $out\_count1 = 1$, else $out\_count1 = 0$;

If $recipient\_life \leq Y_{10}$ then $recipient\_life1 = 1$, else $recipient\_life1 = 0$;

If $Y_{11} < distinct\_receipts \leq Y_{12}$ then $distinct\_rcv1 = 1$, else $distinct\_rcv1 = 0$;

If $distinct\_receipts > Y_{13}$ then $dist\_rcv2 = 1$, else $distinct\_rcv2 = 0$;

Equation (3) Terms:

If $first\_charged \leq Y_{14}$ then $first\_charged1 = 1$, else $first\_charged1 = 0$;

If $Y_{15} < first\_charged \leq Y_{16}$ then $first\_charged2 = 1$, else $first\_charged2 = 0$;

If $first\_charged > Y_{17}$ then $first\_charged3 = 1$, else $first\_charged3 = 0$;

If $out\_amount \leq 0$ then $out\_amount1 = 0$, else $out\_amount1 = \ln(out\_amount)$;

If $out\_count < Y_{18}$ then $out\_count1 = 1$, else $out\_count1 = 0$;

If $out\_count > Y_{19}$ then $out\_count2 = 1$, else $out\_count2 = 0$;

$failed\_cnt\_ratio = failed\_count/(cleared\_count + failed\_count)$;

if $cleared\_sum \leq Y_{20}$ then $cleared\_sum1 = 1$, else $cleared\_sum1 = 0$;

if $cleared\_sum > Y_{21}$ then $cleared\_sum2 = 1$, else $cleared\_sum2 = 0$;

If $failed\_sum\_ratio \leq 0$ then $failed\_sum1 = 1$, else $failed\_sum1 = 0$;

If $failed\_sum\_ratio > Y_{22}$ then $failed\_sum2 = 1$, else $failed\_sum2 = 0$;

If $funding\_ratio > Y_{23}$ then $funding\_ratio1 = 1$, else $funding\_ratio1 = 0$;

Equation (4) Terms:

If first_charged≦0 then first_charged1=1, else first_charged1=0;

If 0<first_charged≦$Y_{24}$ then first_charged2=1, else first_charged2=0;

If first_charged≧$Y_{25}$ then first_charged3=1, else first_charged3=0;

If recipient_life≦$Y_{26}$ then recipient_life1=1, else recipient_life1=0;

If distinct_payments≦$Y_{27}$ then distinct_pay1=1, else distinct_pay1=0;

If $Y_{28}$≦distinct_payments≦$Y_{29}$ then distinct_pay2=1, else distinct_pay2=0;

If failed_sum_ratio≦0 then failed_sum1=1, else failed_sum1=0;

If failed_sum_ratio≦$Y_{30}$ then failed_sum2=1, else failed_sum2=0;

If $Y_{31}$<funding_ratio≦$Y_{32}$ then funding_ratio1=1, else funding_ratio1=0;

If funding_ratio>$Y_{33}$ then funding_ratio2=1, else funding_ratio2=0;

Each term of equations (1) through (4) is ultimately derived from conditions such as those defined in TABLE 2 and/or TABLE 1. Thus, first_charged1, first_charged2 and similar terms are based on the condition first_charged, distinct_pay1 and distinct_pay2 are derived from distinct_payments, and so on.

Any or all of the terms of a risk score equation may be modified by coefficients that may take on any value—positive, negative or zero. The use of coefficients allows an equation to be tuned as desired for a particular system, operating environment, different circumstances regarding the requested value transfer (e.g., type of merchant, type of requesting user) or other factor(s). Thus, if a particular term is meaningless in a certain circumstance, its coefficient could be set to zero.

Yet further, instead of applying different equations for different scenarios or circumstances, a single, monolithic equation could be applied. Thus, the terms of equations (1) through (4) above could be combined to yield a single equation to apply every time. Terms of such a monolithic equation could be configured to drop out (i.e., equal 0) when they are not needed for a particular circumstance. For example, when a term drawn from equation (4) is calculated, it (or a coefficient assigned to the term) could be set to zero if the present transaction is the user's first.

Figure 3:
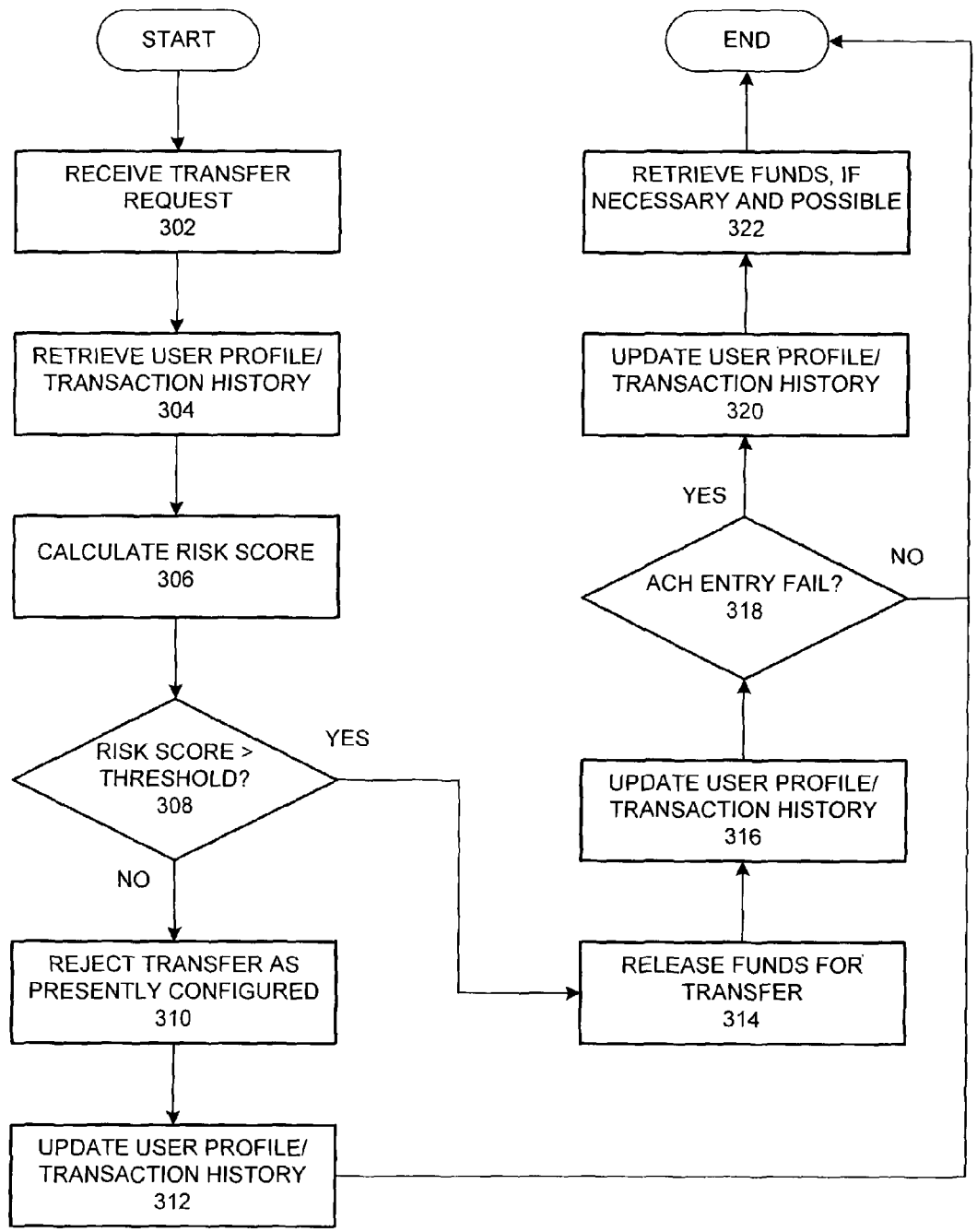
FIG. 3 is a flowchart illustrating one method of determining a risk of making funds from an ACH debit available before the debit entry clears, in accordance with an embodiment of the invention.

FIG. 3 depicts an illustrative method of generating and using a risk score to determine whether to perform an instant ACH entry, wherein making proceeds of the ACH entry are made available to a user without waiting for settlement of the entry. In the illustrated embodiment of the invention, the higher the ACH risk score calculated for a user's desired ACH entry, the more likely it is the system will accept it.

In state 302, a value transfer request is received from a user. One or more details of the request also be received (e.g., amount, recipient username or identity). The value transfer may be to another user or entity, or may be intended to transfer funds into the user's system account.

In response to the request, in state 304 the system retrieves a profile of the requesting user, which may include a history of past value transfers, ACH entries and/or other transactions involving the user. The system may also load or retrieve various cut-off or threshold values.

For example, the system may determine how many instant ACH entries a user (or this particular user) is permitted to have outstanding at one time (e.g., forty), the total amount (e.g., dollar value) the user may have in outstanding instant ACH entries (e.g., $3,000), a minimum risk score the user must have before he or she will be allowed to initiate an instant ACH entry (e.g., fifty) or other operation (e.g., electronic check, normal ACH entry), a threshold value above which the amount of the user's requested ACH entry may be authorized or held against a credit card or other source (e.g., $25) (as described in a previous section), etc. However, in one implementation of this embodiment, funds that a user requests via an instant ACH entry are never held or authorized against his or her credit source.

If the user already has the maximum number, or amount, of instant ACH entries outstanding, the user may automatically be prohibited from submitting an instant ACH entry. Conversely, if the amount the user desires to retrieve via the ACH entry is less than a threshold, the system may accept and process the ACH entry without even calculating a risk score, or may accept the entry even if the user has reached a maximum number or amount of outstanding instant entries.

In state 306, an ACH risk score is calculated based on some or all of the variables and/or other factors discussed above. Illustratively, different equations or algorithms may be applied to calculate a risk score in different circumstances or variables or coefficients of an equation may be altered depending on the circumstances. For example, if the user has never before attempted an ACH entry through the system, or has never attempted an instant ACH entry, then one equation may be used or one value may be assigned to a variable or coefficient within an equation. If the user has previously attempted an ACH entry or, more specifically, an instant ACH entry, then a different equation or value may be applied.

Yet another equation may be applied if the user is requesting an instant ACH entry to deposit funds into an account with the system (e.g., rather than to transfer funds to another user). Also, the equation (or form of equation) that is used may depend on the merchant (or other recipient of the transfer), the type of goods or services offered by the merchant, the purpose of the transfer, and so on.

In state 308, the calculated risk score is compared to a first threshold that will determine whether the user will be permitted to fund any or all of the value transfer via an instant ACH transfer. The calculated risk score may also be compared to one or more thresholds associated with other funding sources (e.g., electronic check, normal ACH, credit card, debit card), any or all of which may be higher or lower than the first threshold.

For example, in one implementation of the illustrated embodiment, a threshold for allowing an instant ACH entry for the user is fifty. A threshold for allowing an electronic check or normal ACH entry, however, may be lower (e.g., five).

Thus, depending on the calculated risk score, a user may be offered various (or no) options for funding his/her requested value transfer. In particular, if the risk score is below a minimum threshold, the user may not be advanced any funds until they are received and held at the system without restriction.

In one embodiment of the invention, if the risk score exceeds the first threshold, then an instant ACH entry becomes the default method of funding the value transfer. If the risk score is less than the first threshold, a different source may be marked as a default choice (e.g., credit card, electronic check). The user may be allowed to change from the default choice to a different option.

If the risk score exceeds the threshold associated with an instant ACH entry, the method proceeds to state 314.

Otherwise, in state 310 the system disallows an instant ACH entry as an option for funding the desired value transfer. However, the user may be permitted to fund the transfer from the balance of an account maintained on the system, through a credit card transaction, an ACH entry to a different external account, or some other source or method.

In state 312, the user's profile or transaction history is updated to indicate that an ACH entry was disallowed. The reason for the denial, the risk score and/or values of relevant risk factors may be stored as well. After state 312, the procedure may end, or the user may be permitted to reconfigure the value transfer or a detail thereof (e.g., amount of transfer, desired source or method of funding the transfer).

In state 314, the instant ACH entry is initiated and proceeds (i.e., funds) of the instant ACH entry are released to the user (e.g., placed in his or her system account) or transferred as requested (e.g., to another user). In other embodiments of the invention, a different type of ACH entry may be initiated, such as a normal ACH entry or an electronic check, depending on the user's request, the calculated risk score, and/or other factors.

In one implementation of the illustrated embodiment of the invention, funds for the user's value transfer may first be withdrawn from the user's account with the system. In this implementation, only if the user's account balance is less than the amount of the value transfer is an ACH entry initiated to retrieve the difference from the specified external account. In another implementation of this embodiment, the full amount of the value transfer may be retrieved via an ACH entry, some of which may then be used to replenish the user's account with the system.

In another embodiment of the invention, an authorize or hold may be placed against a credit source associated with the user. This may be done to help ensure recovery of the amount released to the user.

In state 316, the user's profile and/or transaction history are updated. In particular, the user's history may be updated to increase the number and total value of (instant) ACH entries outstanding. The risk score and/or any or all of the factors considered in calculating the risk score may be saved.

In state 318, the system determines whether the instant ACH entry fails. The entry may be rejected by a clearinghouse or other ACH entry processor, may be returned by the receiving bank or institution, may be repudiated by the user, etc. Thus, failure of the entry may be detected quickly or may not occur until some period of time after the entry was initiated.

Illustratively, the user's transaction history is updated to indicate the failure, and the reason for the failure may be saved. For example, the ACH entry may fail because of insufficient funds in the user's bank account, because the bank account was closed or is frozen, because payment was stopped, because the entry contained an error (e.g., wrong or invalid bank account number), etc.

If the entry fails, the method continues to state 320. Otherwise, the procedure ends (and the user's profile is updated to indicate the success of the entry).

In state 320, the user's profile and/or transaction history are updated to indicate the ACH entry failure. Also, the number and total value of the user's outstanding (instant) ACH entries may be decreased appropriately.

Also in state 320, the user's account with the system, or ability to use the system, may be curtailed or terminated. This action may depend upon the reason for failure of the ACH entry. For example, if the entry is returned as unauthorized, or the user repudiated the ACH entry, closed her bank account, stopped payment or took similar action before the entry cleared, then the user may be suspected of fraud and her use of the system may be restricted accordingly.

In state 322, if the value transfer has not yet cleared or settled, then the system may reverse or stop the transfer. If, however, the transfer has been completed, the system may attempt to retrieve the value, or at least the portion of the value funded by the instant ACH entry.

Depending on the type of ACH entry failure, the system may re-try the entry. For example, if the failure was due to insufficient funds or uncollected funds, the entry may succeed on a subsequent attempt.

Or, the system may decrement the user's account with the system or charge a credit source (e.g., credit card, debit card, credit line) associated with the user. If an authorization was previously made against the credit source, either that authorization or a new one may be used for the charge. The illustrated procedure then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An automated method of determining whether to release funds from an ACH (Automated Clearinghouse) entry before the ACH entry clears, the method comprising:
   receiving from a user a request to transfer value;
   retrieving a profile of the user;
   calculating, using one or more processors, a risk using one or more details from the user profile by computing a risk score, said risk is inversely proportional to said risk score, the risk score indicating a perceived risk involved with releasing funds before the ACH entry clears;
   if said risk is less than an instant ACH threshold, allowing the user to fund the transfer of value with an instant ACH entry;
   if said risk is greater than the instant ACH threshold, allowing the user to fund the transfer of value with one of an electronic check, a normal ACH entry, and a credit card; and
   if the transfer of value is to be funded with the instant ACH entry:
      initiating a first ACH entry to obtain funds from a financial account of the user; and
      providing the user the funds before the first ACH entry clears.

2. The method of claim 1, wherein the request is received at an online system to facilitate transfers of value between online user.

3. The method of claim 1, wherein said details comprise:
   a count of outstanding ACH entries requested by the user; and
   a total value of the outstanding ACH entries.

4. The method of claim 3, wherein said allowing comprises allowing the user to fund the transfer of value with an instant ACH entry if the total value of the outstanding ACH entries is less than a maximum allowable value.

5. The method of claim 4, further comprising increasing the total value by the funds of the first ACH entry.

6. The method of claim 3, wherein said allowing comprises allowing the user to fund the transfer of value with an instant ACH entry if the count of outstanding ACH entries is less than a maximum allowable number of outstanding ACH entries.

7. The method of claim 6, further comprising incrementing the count of outstanding ACH entries.

8. The method of claim 1, wherein said details comprise an amount of time the user has been a user of an online value transfer system at which the request is received.

9. The method of claim 1, wherein said details comprise:
a reject ratio to indicate a ratio between the number of unsuccessful ACH entries within a number of previous ACH entries requested by the user and the number of previous ACH entries; and
an amount ratio to indicate a ratio between the funds of the first ACH entry and an average amount of funds of the previous ACH entries.

10. The method of claim 1, wherein said details comprise the number of completed ACH entries within a number of previous ACH entries requested by the user, wherein an ACH entry is completed if it clears or fails.

11. The method of claim 1, wherein said details comprise one or more of:
a number of previous ACH entries requested by the user;
a debit card indication to indicate whether a primary fund source of the user is a debit card;
a credit card indication to indicate whether the user has previously completed a credit card transaction; and
a trust indicator to indicate a level of trust in the user's stated identity.

12. The method of claim 1, wherein said details comprise:
a number of previous ACH entries requested by the user; and
a trust indicator to indicate a level of trust in the user's stated identity.

13. The method of claim 12, wherein said details further comprise:
a debit card indication to indicate whether a primary fund source of the user is a debit card; and
a credit card indication to indicate whether the user has previously completed a credit card transaction.

14. The method of claim 1, wherein said computing comprises:
evaluating a risk equation comprising a set of terms representing conditions of the transfer of value.

15. The method of claim 14, wherein one or more of said terms include adjustable coefficients.

16. The method of claim 14, wherein said conditions include one or more conditions regarding the user.

17. The method of claim 14, wherein said conditions include one or more conditions regarding previous transfers of value requested by the user.

18. The method of claim 14, wherein said conditions include one or more conditions regarding the recipient of the transfer of value.

19. The method of claim 14, wherein said condition; include one or more conditions regarding terms of the transfer of value.

20. The method of claim 1, wherein said allowing comprises:
offering the user one or more options for funding the transfer of value, including a first option comprising an instant ACH entry.

21. The method of claim 20, wherein said options further include a second option comprising a normal ACH entry, wherein funds of a normal ACH entry are provided to the user only after the normal ACH entry clears.

22. The method of claim 20, wherein said options further include a second option comprising an electronic check.

23. The method of claim 20, wherein said options further include a second option comprising a credit card transaction.

24. The method of claim 1, wherein the user is allowed to fund the transfer of value with the electronic check if said risk is greater than the instant ACH threshold but not greater than an electronic check threshold.

25. The method of claim 1, wherein the user is allowed to fund the transfer of value with the normal ACH entry if said risk is greater than the instant ACH threshold but not greater than a normal ACH threshold, wherein funds of the normal ACH entry are provided to the user only after the normal ACH entry clears.

26. The method of claim 1, wherein the user is allowed to fund the transfer of value with the credit card if said risk is greater than the instant ACH threshold but not greater than a credit card threshold.

27. The method of claim 1, further comprising:
if the funds of the ACH entry are greater than a predetermined value, initiating an authorization against a credit source of the user to cover the funds.

28. The method of claim 1, further comprising:
if the funds of the ACH entry are greater than a predetermined value, initiating a hold against a credit source of the user to cover the funds.

29. The method of claim 1, further comprising:
if the first ACH entry fails, initiating an authorization against a credit source of the user to cover the funds.

30. The method of claim 1, further comprising:
if the first ACH entry fails, initiating a hold against a credit source of the user to cover the funds.

31. A computer readable storage medium storing instructions that, when executed by a computer, cause the computer to perform a method of determining whether to release funds from an ACH (Automated Clearinghouse) entry before the ACH entry clears, the method comprising:
receiving from a user a request to transfer value;
retrieving a profile of the user;
calculating a risk using one or more details from the user profile by computing a risk score, said risk is inversely proportional to said risk score, the risk score indicating a perceived risk involved with releasing funds before the ACH entry clears;
if said risk is less than an instant ACH threshold, allowing the user to fund the transfer of value with an instant ACH entry;
if said risk is greater than the instant ACH threshold, allowing the user to fund the transfer of value with one of an electronic check, a normal ACH entry, and a credit card; and
if the transfer of value is to be funded with an instant ACH entry:
initiating a first ACH entry to obtain funds from a financial account of the user; and
providing the user the funds before the first ACH entry clears.

32. A method of releasing funds of an ACH (Automated Clearing House) debit before the ACH debit is completed, the method comprising:
receiving a value transfer request at a facilitating organization from a first entity, said value transfer comprising a transfer of a first value to a second entity;
retrieving data concerning one or more previous ACH entries initiated for the first entity;
identifying a rejection ratio regarding said previous ACH entries, wherein said rejection ratio comprises a ratio of the number of failed entries in said previous ACH entries to the number of said previous ACH entries;
identifying a completion count comprising the number of completed entries in said previous ACH entries;
identifying an amount ratio comprising the ratio of the first value to an average value of said previous ACH entries;
calculating, using one or more processors, a risk score from a plurality of factors, including said rejection ratio, said completion count, and said amount ratio, the risk score indicating a perceived risk involved with releasing funds before the ACH debit clears;
if said risk score exceeds a first threshold:
initiating a first ACH debit entry for the first value;
updating the data to reflect the first ACH debit entry; and
releasing the first value before the first ACH debit entry clears; and
if said risk score does not exceed said first threshold, initiating a normal ACH debit entry or an electronic check for the first value.

33. The method of claim 32, wherein a completed ACH debit entry is an ACH debit entry that cleared or failed.

34. The method of claim 32, wherein said first ACH debit entry is a default option for funding the value transfer.

35. The method of claim 32, further comprising:
authorizing the first value against a credit source of the first entity; and
holding the first value against the credit source.

36. The method of claim 35, further comprising:
if said first ACH debit entry fails, charging a portion of the first value against the credit source.

37. The method of claim 32, further comprising:
verifying one or more details of a financial account associated with the first entity;
wherein said first ACH debit entry involves the financial account.

38. The method of claim 32, further comprising
based on said initiating the normal ACH debit entry for the first value,
releasing the first value only after the normal ACH debit entry clears.

39. The method of claim 32, further comprising
based on said initiating the electronic check for the first value
releasing the first value only after the electronic check clears.

40. The method of claim 32, wherein said plurality of factors further comprises the length of time the first entity has had an account with the facilitating organization.

41. The method of claim 32, wherein said plurality of factors further comprises said number of said previous ACH entries.

42. The method of claim 32, wherein said plurality of factors further comprises a level of trust in the first entity.

43. The method of claim 42, wherein the level of trust comprises a rating provided by a third party.

44. The method of claim 32, wherein said plurality of factors further comprises an indicator of the type of primary credit source of the first entity.

45. The method of claim 32, wherein said plurality of factors further comprises whether the first entity engaged in one or more successful credit card transactions.

46. A computer readable storage medium storing instructions that, when executed by a computer, cause the computer to perform a method of releasing funds of an ACH (Automated Clearing House) debit before the ACH debit is completed, the method comprising:
receiving a value transfer request at a facilitating organization from a first entity, said value transfer comprising a transfer of a first value to a second entity;
retrieving data concerning one or more previous ACH entries initiated for the first entity;
identifying a rejection ratio regarding said previous ACH entries, wherein said rejection ratio comprises a ratio of the number of failed entries in said previous ACH entries to the number of said previous ACH entries;
identifying a completion count comprising the number of completed entries in said previous ACH entries;
identifying an amount ratio comprising the ratio of the first value to an average value of said previous ACH entries;
calculating a risk score from a plurality of factors, including said rejection ratio, said completion count, and said amount ratio, the risk score indicating a perceived risk involved with releasing funds before the ACH debit clears;
if said risk score exceeds a first threshold:
initiating a first ACH debit entry for the first value;
updating the data to reflect the first ACH debit entry; and
releasing the first value before the first ACH debit entry clears; and
if said risk score does not exceed said first threshold, initiating a normal ACH debit entry or an electronic check for the first value.

47. A computer-implemented method of releasing funds of an ACH (Automated Clearing House) entry before the ACH entry is completed, the method comprising:
receiving at a facilitating organization a value transfer request from a first entity, said value transfer comprising a transfer of a first value to a second entity;
configuring a risk equation for determining a risk associated with releasing the first value before settlement of an ACH entry to retrieve the first value;
evaluating, using one or more processors, said risk equation to determine a risk score, said risk is inversely proportional to said risk score, the risk score indicating a perceived risk involved with releasing funds before the ACH entry is settled;
if said risk is lower than a first threshold:
initiating the ACH entry; and
transferring the first value to the second entity before the ACH entry is settled; and
if said risk is not lower than the first threshold:
initiating the ACH entry; and
transferring the first value to the second entity after the ACH entry is settled.

48. The method of claim 47, further comprising:
if the ACH entry fails to successfully settle within a predetermined period of time, charging the first value against a credit source of the first entity.

49. The method of claim 47, wherein said configuring comprises:
configuring terms of said risk equation based on conditions of said value transfer; and
assigning values to coefficients of one or more of said terms.

50. The method of claim 47, wherein said configuring comprises:
examining one or more conditions of said value transfer; and
based on the conditions, selecting said risk equation from a set of risk equations.

51. The method of claim 47, wherein said configuring comprises:
configuring a term of said risk equation based on a length of time that has passed since the first entity made a charge against a credit source.

52. The method of claim 47, wherein said configuring comprises:
configuring a term of said risk equation based on the length of time the second entity has been registered with the facilitating organization.

53. The method of claim 47, wherein said configuring comprises:
configuring a term of said risk equation based on whether the first entity is a natural person.

54. The method of claim 47, wherein said configuring comprises:
configuring a term of said risk equation based on whether the second entity is a natural person.

55. The method of claim 47, wherein said configuring comprises:
configuring a term of said risk equation based on the type of business in which the second entity is engaged.

56. The method of claim 47, wherein said configuring comprises:
configuring a term of said risk equation based on the number of distinct entities from which the first entity has received value transfers.

57. The method of claim 47, wherein said configuring comprises:
configuring a term of said risk equation based on the number of distinct entities to which the first entity has requested value transfers.

58. The method of claim 47, wherein said configuring comprises:
configuring a term of said risk equation based on the total amount of value of ACH entries requested by the first entity that have not settled.

59. The method of claim 47, wherein said configuring comprises:
configuring a term of said risk equation based on the total number of ACH entries requested by the first entity that have not settled.

60. The method of claim 47, wherein said configuring comprises:
determining a number of ACH entries requested by the first entity that have failed.

61. The method of claim 60, wherein said configuring further comprises:
determining the ratio of the number of failed ACH entries within a set of ACH entries requested by the first entity.

62. The method of claim 47, wherein said configuring comprises:
configuring a term of said risk equation based on the total value of a set of ACH entries requested by the first entity that failed.

63. The method of claim 47, wherein said configuring comprises:
configuring a term of said risk equation based on the total value of a set of ACH entries requested by the first entity that successfully settled.

64. The method of claim 47, wherein said configuring comprises:
configuring a term of said risk equation based on a ratio of the first value to a maximum amount of an ACH entry requested by the first user that successfully settled.

* * * * *

UNITED STATES PATENT AND TRADEMARK OFFICE
CERTIFICATE OF CORRECTION

PATENT NO. : 8,050,997 B1
APPLICATION NO. : 10/228200
DATED : November 1, 2011
INVENTOR(S) : Nosek et al.

It is certified that error appears in the above-identified patent and that said Letters Patent is hereby corrected as shown below:

On the Title page, in Item (75), in "Inventors", in column 1, line 1, delete "Paso Alto," and insert -- Menlo Park, --, therefor.

On page 2, under "Other Publications", in column 2, line 5, delete "Tkes" and insert -- Takes --, therefor.

On Sheet 2 of 4, Reference Numeral 112, Figure 1B, line 1, delete "FACILTATOR" and insert -- FACILITATOR --, therefor.

In column 19, line 48, in Claim 19, delete "condition;" and insert -- conditions --, therefor.

In column 21, line 35, in Claim 39, delete "value" and insert -- value, --, therefor.

Signed and Sealed this
Seventeenth Day of January, 2012

David J. Kappos
*Director of the United States Patent and Trademark Office*